F. L. WHITNEY.
IMPLEMENT FOR DIGGING, TRANSPLANTING PLANTS, AND PULLING WEEDS.
APPLICATION FILED MAY 29, 1909.
944,393.
Patented Dec. 28, 1909.
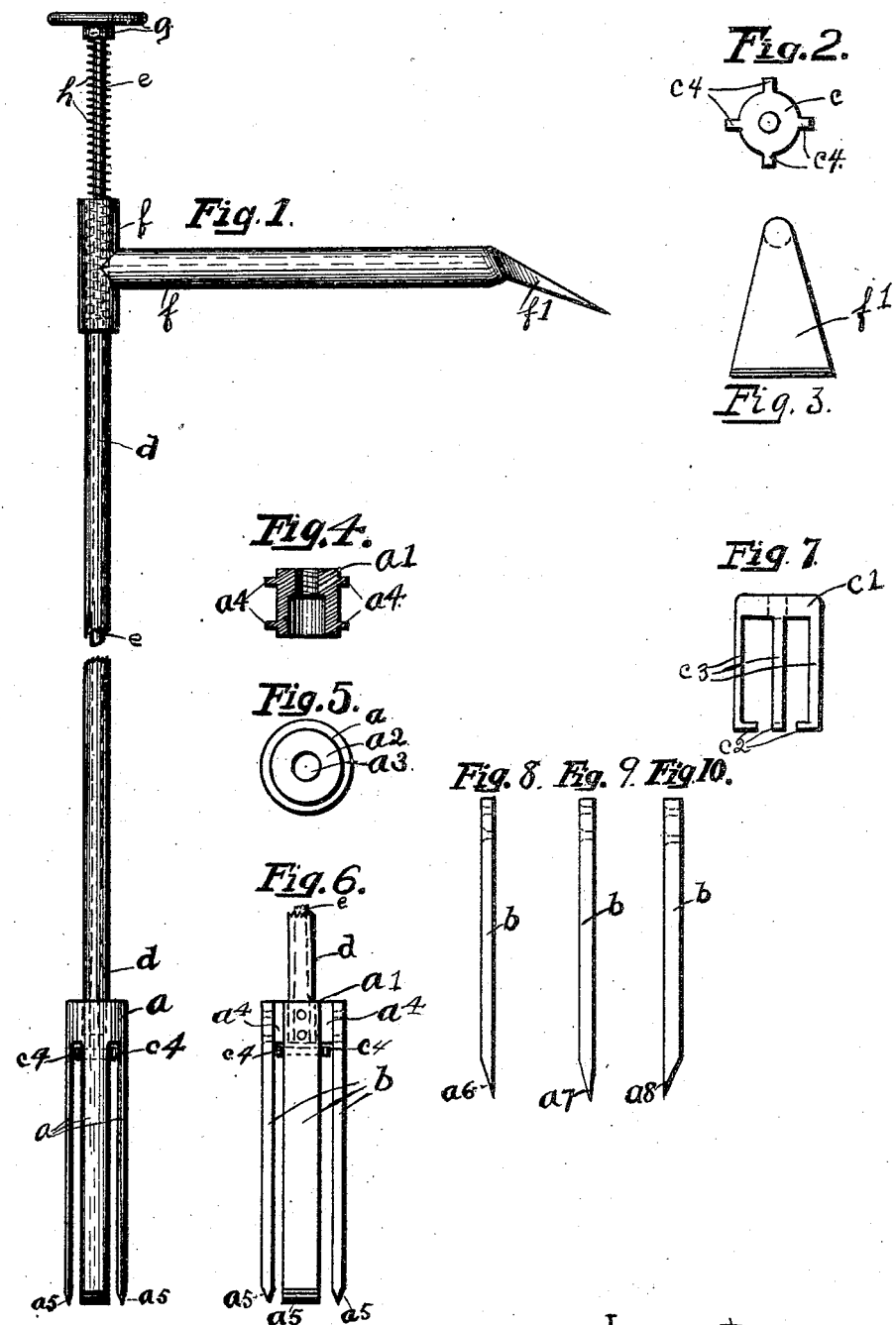
Witnesses,
Waller L. Anderson.
J. F. A. Williams.
Inventor,
Frank L. Whitney,
By Owsley Wilson,
His Attorney.

UNITED STATES PATENT OFFICE.

FRANK L. WHITNEY, OF LINCOLN, NEBRASKA.

IMPLEMENT FOR DIGGING, TRANSPLANTING PLANTS, AND PULLING WEEDS.

944,393.  Specification of Letters Patent.  Patented Dec. 28, 1909.

Application filed May 29, 1909. Serial No. 499,120.

*To all whom it may concern:*

Be it known that I, FRANK L. WHITNEY, a citizen of the United States, residing at Lincoln, in the county of Lancaster and State of Nebraska, have invented an Improved Implement for Digging, Transplanting Plants, and Pulling Weeds, of which the following is a specification sufficiently clear to enable those skilled in the art to which it appertains to make and use the same.

The object of my invention is:—to produce an improved implement for digging, transplanting plants and pulling weeds, which is comparatively inexpensive, simple in construction, convenient to operate, durable and positive in action and adapted to work in all kinds of soil either in sod or in cultivated ground and by which the smallest and most delicate plants may be rapidly transplanted without injury, or handling. These purposes I attain in my invention by certain novel combinations of materials, parts and construction which will be hereinafter described and claimed.

My invention is illustrated in the accompanying drawings which form a part of this specification and in which drawings similar characters of reference refer to similar parts in the several views.

Figure 1, represents a vertical side view of my implement. Fig. 2, represents an interchangeable, weed ejector, plan view. Fig. 3, represents a plan view of hoe on handle of my implement. Fig. 4, represents a malleable cast head for holding the digging blades, showing cross-sectional view. Fig. 5, shows an end view, of bushing and tubular form of constructing the digging portion of my implement in the form shown in Fig. 1. Fig. 6, shows a vertical side view of the digging portion of my implement constructed with the blades riveted on the malleable cast head. Fig. 7, shows a vertical, side view of my transplanting ejector. Fig. 8, shows a vertical side view, showing the narrow side of digging blade with point beveled inwardly. Fig. 9, shows a vertical view of the narrow side of blade with three-fourths of point beveled inwardly. Fig. 10, shows a vertical view of the narrow side of digging blade with edge beveled outwardly.

I make this implement, preferably, as follows:—

The digging portion I make in two forms, "$a$" as shown in Fig. 1, consisting of a tubular piece of steel which I slit from the bottom, longitudinally, so as to form the blades and leave the top or head portion thereof intact. I thread the inside of the top, or head portion, "$a$" in Fig. 5, to receive and mate with corresponding threads of a bushing, or reducer, "$a^2$", Fig. 5, which bushing or reducer I provide with a threaded, central longitudinal, opening adapted to receive and mate with threads on the outer side of the end of a tubular section, "$d$". I make my digging portion also in a second form as shown in Fig. 6, in which I make the top or head portion of a malleable cast head, "$a^1$" of which I show a vertical cross section in Fig. 4, which head I provide with projecting bosses, "$a^4$" adapted to be used in riveting the blades, "$b$" thereon. For this form I make each blade separate, providing rivet holes in the upper end of each blade through which it is solidly riveted to the malleable cast head as shown in Fig. 6, with the blades in substantially the same relative position as shown in Fig. 1, and the digging parts of said blades practically of the same form. I make the blades with their cutting edges beveled so as to adapt them to different kinds of soil and work. The bevel shown in Figs. 1, 6, and 9 is adapted for digging, transplanting and weed pulling in ordinary soils. The bevel shown in Fig. 8 especially adapts same to pulling weeds, such as dandelions, from heavy clay and gumbo soils, while the bevel shown in Fig. 10 is adapted especially for the transplanting of plants from cultivated ground with the slightest disturbance of the roots, equipping interchangeable diggers with the bevel desired. I thread the central opening in the malleable cast head, Fig. 4, to mate with and receive the threads on the end of tubular rod "$d$". I connect the digger portion with the handle, "$f$" by means of the tubular rod, "$d$" which I show, broken, in Fig. 1, by means of threads on the outer end of said rod mating with threads on the inner side of the T shaped portion of the handle "$f$".

I make the handle portion of my implement of tubular metal having a T shaped end, one end of which T is threaded inside to receive the tubular rod, "$d$". I make the other end of the handle portion, "$f$" in the form of a narrow hoe blade, "$f^1$" as shown in Figs. 1 and 3 for uncovering the weeds, so as to locate the roots and for use in transplanting, digging places for plants to be transplanted, and for filling in rows from which plants have been removed, etc.

I make my ejector in two interchangeable forms, as shown in Figs. 1 and 2, where the weed form is shown in the shape of a circular disk having a central, threaded opening adapted to receive the threaded end of the rod "e" and guide projections, "c⁴" adapted to slide in the slots between the digging blades as shown in Figs. 1 and 6. The second form, the interchangeable, transplanting ejector, as shown in Fig. 7, I make with its upper plan view the same as shown in Fig. 2 of the weed ejector, however I make same with downward continuing arms, "c³" Fig. 7, adapted to slide in the slots between the digging blades, forming the ends of said arms, "c³" into the inwardly turned projections, "c²" so as to leave opening between same to prevent bruising the plant.

I make an ejector rod "e" adapted to screw into the central opening in the weed, and the plant ejector, respectively, the said rod "e" passing longitudinally through the tubular rod "d" and projecting through the T shaped section of the handle "f" and above same sufficiently to allow ample and free downward motion of the ejector in the digging section of the implement. I make the top of the ejector rod preferably of metal cast thereon in the form as shown in "g" Fig. 1, consisting of a flat circular top, having a central downward projection with a shallow circular recess around the plunger rod to receive the end of the spring "h" and having the outer portion of the central downward projection threaded to mate with and screw into the upper portion of the T shaped part of the handle, "f". I make an ejector rod spring "h" spiral in form and adapted to encircle the upper end of the rod "e" one end of said spring being seated on the end of the tubular rod "d" and the other end of the spring being seated inside the shallow circular recess provided therefor in the downward central projection of the top "g".

To use my implement as a digger I use same as equipped in Fig. 1. By pressing down on the handle "f" I drive the blades a into the soil until they are filled, pull the digger out and discharge the core of soil from between the blades by means of the ejector "c" which I operate by pressing down on the top, "g" the spiral spring "h" returning the ejector and its connecting rod to the position shown in Fig. 1. After ejecting the core from the blades, I continue the process to the depth desired. To pull weeds I place the digger around the root, press down the handle driving the blades "a" down around the root, withdraw the digger and in ordinary soils often pull a considerable length of the tap root of such weeds as dandelions from below the point reached by the blades. For pulling weeds in heavy clay and gumbo soils I preferably interchange the form of digger shown in Fig. 1, for a digger having blades beveled as shown in blade "b" in Fig. 8, by first unscrewing the weed ejector by turning the top, "g", then unscrewing the digger portion from the tubular rod "d" and screwing thereon the interchangeable digger having blades beveled as shown in Fig. 8, then screwing the weed ejector on the end of the connecting rod "e" and using the same as before. For transplanting plants with the form of beveled blades shown in Fig. 1, I remove the weed ejector shown in Fig. 1 and insert instead the transplanting ejector shown in Fig. 7, press the digger gently down around the plant to be transplanted, allowing the top of the plant to project upward between the inwardly projecting ends, "c²" of the transplanting ejector and lift the plant out placing it in the place and position desired where I gently seat same in the new position by pressing downward on the top, "g". Where preferred, in moving delicate plants in soft soils I substitute an interchangeable digger having beveled blades as shown in Fig. 10, using therewith the transplanting ejector, Fig. 7.

I make my diggers with a plurality of blades, four preferred, though more or less may be used as desired, adapting the ejectors to the number of blades to be used. I use the narrow hoe blade "f¹" on the handle "f" to fill in the soil from where plants have been removed, to prepare places to receive the plants to be transplanted, and to uncover and show the location of the roots of weeds to be pulled and similar use for which same is convenient. In using said hoe, I press the top, "g" down and with a turn fasten same by its screw portion into the upper part of the T end of the handle "f" so that it is entirely out of the way and protects the spiral spring from the soil and dirt.

I do not limit the uses of my implement to those herein stated.

Having thus described my invention, what I claim as new and desire to secure by Letters Patent, is:—

In an implement of the type described, a digging section, said digging section being composed of a cylindrically shaped, malleable cast head and a plurality of longitudinal steel blades riveted at their upper ends to, and positioned around the malleable head leaving uniform slots between the lower portions of the said blades, adapted to slidably engage ejector guides, the lower end of each blade being uniformly sharpened with an outward and an inward bevel, the central opening in the malleable cast head being threaded inside, a tubular metal section, said section being threaded on the outside at its ends to mate with and screw into the tubular metal section and a handle section respectively, a handle, said handle being formed of tubular metal in the shape of a lazy letter T one of the shorter ends thereof being provided inside with threads to mate with and screw on to the end of the tubular metal section, an ejecting device, said device consisting of a circular piece of metal having projecting guide portions adapted to slidably engage the slots between the blades and being provided with a transverse, threaded, central opening, an ejector rod, said rod being adapted to freely slide in the tubular section and in the handle and digging section and to operate the ejector, the lower end of said rod being threaded to mate with and screw into the ejector, the upper end of said rod terminating in a circular metal top cast integral therewith, the under portion of the metal top being provided with a shallow groove around the rod to receive the spiral spring and a spiral spring, said spring being adapted to encircle the upper portion of the ejector rod and having its upper end seated in grooved top prepared therefor and its lower end seated upon the upper end of the tubular metal section within the T part of the handle.

In testimony whereof, I have signed my name to this specification in the presence of two subscribing witnesses.

FRANK L. WHITNEY.

Witnesses:
 J. B. STRODE,
 E. C. STRODE.